United States Patent
Hayashi et al.

(10) Patent No.: US 6,704,126 B1
(45) Date of Patent: Mar. 9, 2004

(54) IMAGE PROCESSOR

(75) Inventors: Eiichi Hayashi, Ohmiya (JP); Yuichi Kawanabe, Ohmiya (JP)

(73) Assignee: Fuji Photo Optical Co., Ltd. (JP)

( * ) Notice: Subject to any disclaimer, the term of this patent is extended or adjusted under 35 U.S.C. 154(b) by 595 days.

(21) Appl. No.: 09/661,501

(22) Filed: Sep. 14, 2000

(30) Foreign Application Priority Data

Sep. 17, 1999 (JP) .......................................... 11-263025

(51) Int. Cl.⁷ ................................................ H04N 1/04
(52) U.S. Cl. ...................... 358/475; 358/497; 358/483
(58) Field of Search ................................ 358/497, 494, 358/474, 471, 483, 482, 475, 512–514, 506, 487, 509, 505; 382/313, 312; 399/211; 250/208.1, 234–236

(56) References Cited

U.S. PATENT DOCUMENTS

| | | | |
|---|---|---|---|
| 5,673,107 A | * | 9/1997 | Masuda .......................... 355/2 |
| 6,067,174 A | | 5/2000 | Hayashi ....................... 358/497 |
| 6,091,517 A | | 7/2000 | Hayashi ....................... 358/497 |
| 6,108,505 A | | 8/2000 | Hayashi ....................... 399/206 |
| 6,376,822 B1 | * | 4/2002 | Fujimoto et al. ........ 250/208.1 |
| 6,445,836 B1 | * | 9/2002 | Fujiwara ..................... 358/497 |

FOREIGN PATENT DOCUMENTS

| | | |
|---|---|---|
| JP | 06308627 | 11/1994 |
| JP | 10051597 | 2/1998 |

OTHER PUBLICATIONS

Ando, "Scanner Unit". US. patent application Publication No. US. 2002/0106217 A1, Aug. 8, 2002.*
US Application No. 09/038,735 entitled Guiding Mechanism for Slidable Movement of a Carrier in an Image Processor.
US application No. 09/310,392 entitled Take–Up Pulley in an Image Processor.
US Application No. 09/310,437 entitled Driving Shaft Construction in an Image Processor.

* cited by examiner

*Primary Examiner*—Cheukfan Lee
(74) *Attorney, Agent, or Firm*—Price, Heneveld, Cooper, DeWitt & Litton

(57) ABSTRACT

The present invention discloses an image processor, in which an inverter for driving a fluorescent lamp is disposed in separation into parts at both ends of a carriage mounting the fluorescent lamp thereon in a direction perpendicular to a scanning direction of the carriage, so as to shorten a harness between the fluorescent lamp and the inverter and dispense with a part projecting in the scanning direction of the carriage, thereby achieving miniaturization. Inverters for driving a fluorescent lamp are disposed in appropriate separation at both ends of a full-rate carriage mounting the fluorescent lamp thereon in a scanning direction of the full-rate carriage and does not project in the scanning direction of the full-rate carriage. Thus, it is unnecessary to provide space in a casing for accommodating a projecting inverter in the case at a scanning ending end, thereby allowing miniaturizing the casing.

4 Claims, 4 Drawing Sheets

IMAGE PROCESSOR

BACKGROUND OF THE INVENTION

1. Field of the Invention

The present invention relates to an image processor for irradiating an original with light emitted from a light source lamp so as to read image information formed on the original by the light reflected on the original. Based on the image information read by the image processor, a copying machine performs printing on a recording sheet to restore the image information, a scanner converts the image information into data which can be used in a computer, and the like.

2. Description of the Related Art

In the image processor of stationary original type, scanning is performed to gain image information per line while a light source lamp is moved with respect to an original placed on a platen glass. A fluorescent lamp is used as the light source lamp, and a fluorescent lamp inverter is used for supplying a voltage for driving the fluorescent lamp. In order to gain the image information by scanning the original, the light source lamp is mounted on a carriage, which can be freely moved along the original. Furthermore, the carriage provided with the light source lamp is a full-rate carriage movable by a distance substantially equal to the length of the platen glass in such a manner as to scan the original of a maximum size placed on the platen glass. Moreover, since the fluorescent lamp inverter need be moved together with the scanning of the light source lamp, it is fixed to the full-rate carriage, as disclosed in, for example, Japanese Patent Application Laid-open No. 6-308627.

FIG. 3 illustrates the schematic structure in which a fluorescent lamp inverter is provided in a full-rate carriage 1. The full-rate carriage 1 is fixed to an image processor in such a manner as to be moved in a direction indicated by a double-headed arrow P in FIG. 3; wherein one head $P_1$ of the arrow P indicates a scanning direction and the other head $P_2$ indicates a returning direction in which the carriage returns to its start position after the completion of the scanning. A fluorescent lamp inverter 2 is disposed forward in the scanning direction of the full-rate carriage 1, i.e., at a hatched portion A by appropriate means.

In the full-rate carriage 1, a supporter 1a extends in the scanning direction for securing a stable movement, as shown in FIG. 3, and is formed into a U-shape as viewed in plan. As shown in FIG. 4, since a half-rate carriage 3 movable by substantially a half of the moving distance of the full-rate carriage 1 is intruded into the U-shaped inside portion of the supporter 1a, the fluorescent lamp inverter 2 cannot be disposed in the U-shaped inside portion of the supporter 1a. The combination of the full-rate carriage 1 and the half-rate carriage 3 is directed to keep the length of an optical path constant. That is, the light reflected on the original is reflected in sequence by a first reflector, not shown, fixed to the full-rate carriage 1 and a second and a third reflector, neither shown, fixed to the half-rate carriage 3, and then, enters into photoelectric converter such as a CCD (a charge-coupled device) through a focusing lens. The length of the optical path from the original to the photoelectric converter can be kept constant also by the movements of the carriages 1 and 3.

However, as shown in FIG. 3, when the fluorescent lamp inverter 2 is fixed to the full-rate carriage 1, the hatched portion A shown in FIG. 3 possibly projects from the full-rate carriage 1 in the direction indicated by the head $P_1$ of the arrow P. Since this direction indicated by the head $P_1$ is the scanning direction, a portion capable of relieving the portion A need be formed in a casing of the image processor in the state in which the full-rate carriage 1 is moved up to a scanning ending position in the case where the entire original is scanned. This may put an obstacle in the way of miniaturization of an image processor. In view of this, if the fluorescent lamp inverter is fixingly disposed at an appropriate position in the image processor in such a manner as to dispense with the portion A, a harness for connecting the fluorescent lamp inverter and the light source lamp to each other is lengthened, to induce occurrence of voltage noise, with an attendant danger of instability of the light emitted from the light source lamp.

Furthermore, like an image processor disclosed in Japanese Patent Application Laid-open No. 10-51597, a fluorescent lamp inverter is attached to a conveyor belt for driving a half-rate carriage, and is conveyed at a half of a rate of a full-rate carriage, wherein the fluorescent lamp inverter and a light source lamp are connected to each other via a bendable harness unit. However, the structure for fixing the fluorescent lamp inverter to the conveyor belt may possibly become complicated, the harness may be possibly bent or stretched, and further, occurrence of voltage noise cannot be suppressed because the harness needs a certain length.

In view of this, an object of the present invention is to provide an image processor which is configured such that a fluorescent lamp inverter is fixed to a full-rate carriage mounting a light source lamp thereon in as close arrangement as possible, occurrence of voltage noise can be suppressed, and no space for accommodating the fluorescent lamp inverter need be defined even at a scanning ending position of the full-rate carriage, thereby achieving miniaturization.

SUMMARY OF THE INVENTION

As technical means for achieving the above-described object, an image processor according to the present invention for scanning an original at irradiation positions sequentially varied by moving a light source lamp with respect to the original so as to optically gain image information on the original comprises an inverter for the light source lamp disposed at an end in a direction perpendicular to a scanning direction of a carriage mounting the light source lamp thereon.

Since the inverter is disposed in the carriage mounting the light source lamp thereon, a harness or the like connecting these components to each other cannot be lengthened, thereby suppressing occurrence of voltage noise. Furthermore, since the inverter is disposed at the end of the carriage, no space for accommodating the inverter in the scanning direction need be defined at a scanning ending position of the carriage, thus achieving miniaturization of a casing for accommodating the carriage, and further, achieving miniaturization of the image processor.

Moreover, the image processor according to the invention as claimed in claim 2, for scanning an original at irradiation positions sequentially varied by moving a light source lamp with respect to the original so as to optically gain image information on the original, comprises: a carriage movable in a scanning direction, the carriage mounting the light source lamp thereon; guide means disposed in a casing along the scanning direction, the guide means mounting thereon both ends of the carriage in a direction perpendicular to the scanning direction, for supporting the carriage and guiding the movement of the carriage; and an inverter for the light source lamp disposed at the end mounted on the guide means for the carriage.

Since the inverter is supported via the carriage by the guide means for supporting the carriage, the carriage can be stably moved without any deformation.

Additionally, in the image processor according to the invention as claimed in claim 3, component parts of the inverter are disposed at the ends, respectively, in appropriate separation.

Since the component parts of the inverter are constituted of parts, which are easy, to be separated the connection or wiring between the parts cannot become complicated.

Furthermore, in the image processor according to the invention as claimed in claim 4, the component parts of the inverter are disposed at the ends, respectively, in the distribution of substantially equal weights.

If the component parts of the inverter are separated in the distribution of substantially equal weights, the weights born at the ends of the carriage become equal to each other, thereby achieving a more stable movement.

DETAILED DESCRIPTION OF THE EMBODIMENT

Figure 2:
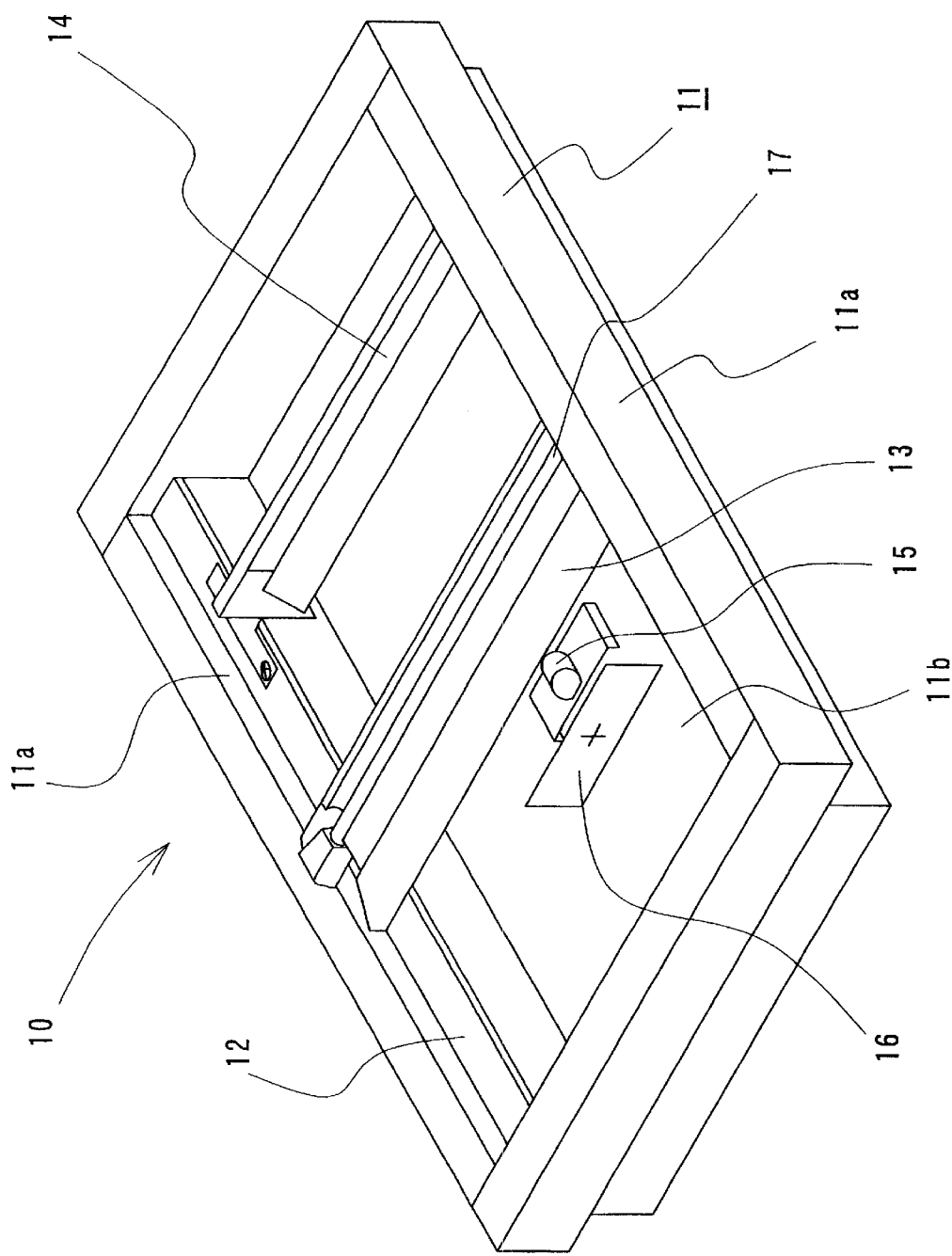
FIG. 2 is a perspective view schematically showing the image processor.
Figure 3:
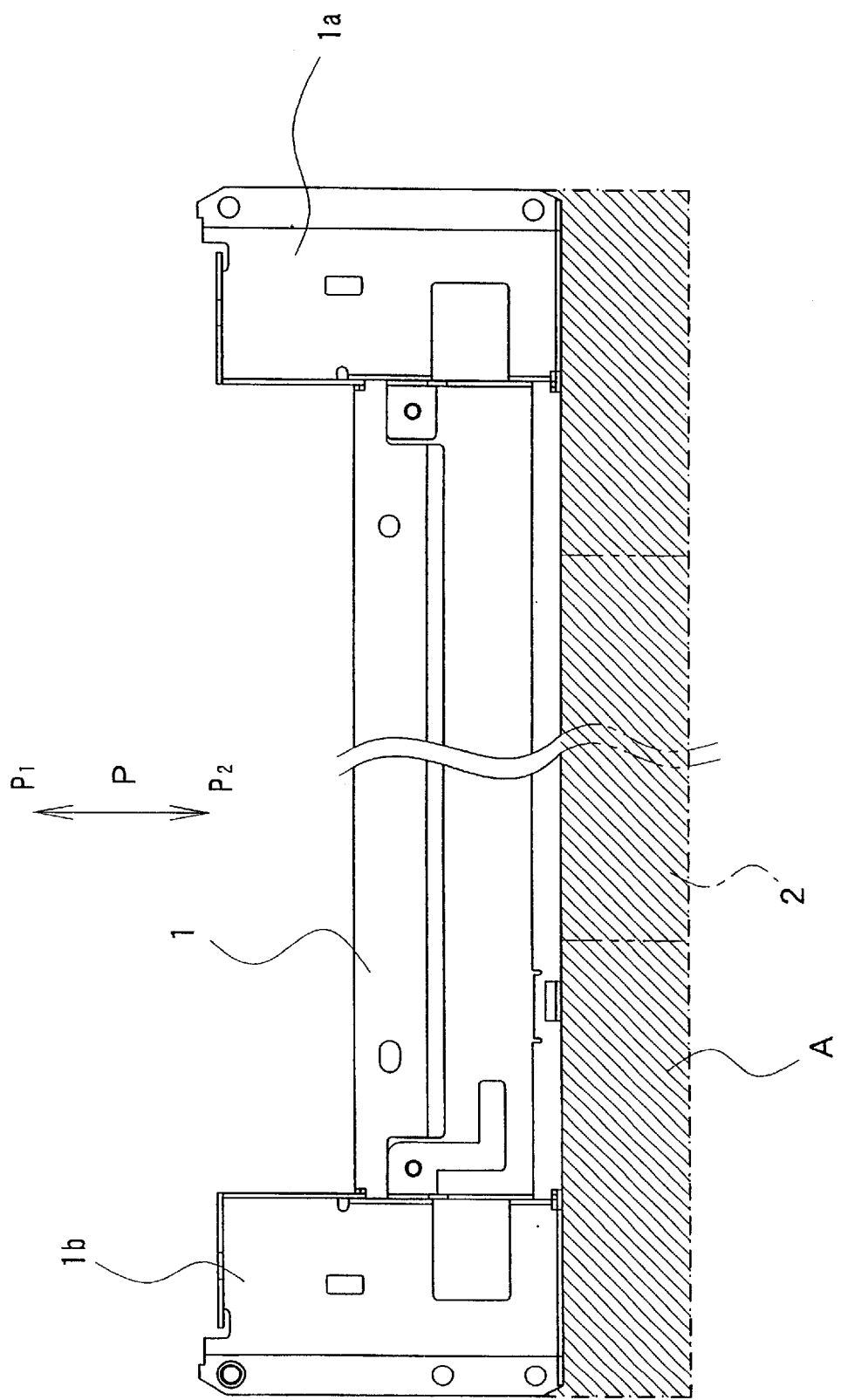
FIG. 3 is a plan view showing a carriage mounting a light source lamp thereon in the prior art, corresponding to FIG. 1, wherein an inverter is mounted at a hatched portion.
Figure 4:
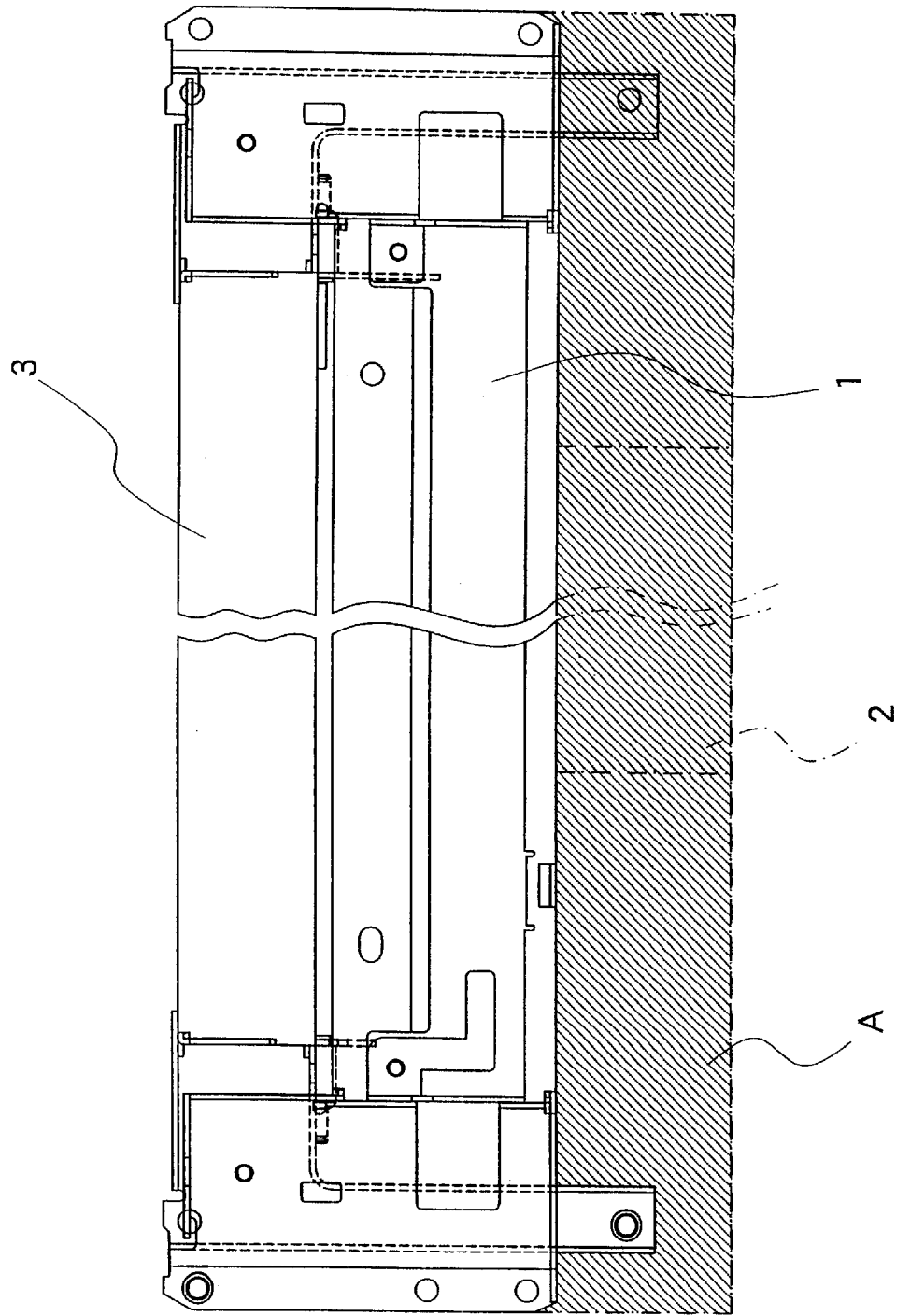
FIG. 4 is a plan view showing the state in which one of a pair of carriages is intruded into the other, in an image processor in the prior art.

An image processor according to the present invention will be specifically described below by way of a preferred embodiment illustrated in the drawings. FIG. 2 is a perspective view schematically showing the image processor 10 according to the present invention. Guide trucks 12 serving as guide means is housed inside of both sidewalls 11a in a longitudinal direction of a substantially rectangular casing 11. The upper surface of guide trucks 12 is substantially horizontal. A full-rate carriage 13 and a half-rate carriage 14 are mounted at the upper surface of guide trucks 12 in such a manner as to be freely moved on guide trucks 12. A focusing lens 15 and photoelectric converter 16 such as a CCD are disposed at appropriate positions on a bottom plate 11b of the casing 11. Moreover, a platen glass, not shown, is fixed above the casing 11, and an original is placed on the platen glass.

A fluorescent lamp 17 serving as a light source lamp is mounted on the full-rate carriage 13, and irradiates the original placed on the platen glass. A first reflector, not shown, is fixed to the full-rate carriage 13, thereby reflecting light reflected on the original toward the half-rate carriage 14. A second and a third reflector, neither shown, are fixed to the half-rate carriage 14. The light reflected on the first reflector is reflected in sequence by the second and third reflectors, and then, enters into the focusing lens 15. The reflected light transmitted through the focusing lens 15 enters into the photoelectric converter 16, to be converted into a voltage according to the intensity of the reflected light.

The original placed on the platen glass remains at rest, and therefore, the fluorescent lamp 17 must be moved at irradiation positions. Consequently, the full-rate carriage 13 is moved in the longitudinal direction of the casing 11 by a driving mechanism, not shown. Furthermore, the fluorescent lamp 17 need irradiate the entire original with the light, so that the full-rate carriage 13 is moved from one end of the casing 11 to the other end thereof. In contrast, the half-rate carriage 14 is driven in such a manner as to be moved by substantially a half of the movement of the full-rate carriage 13. According to a difference in movement between these carriages 13 and 14, it is possible to keep constant the length of an optical path from the original to the photoelectric converter 16 after the reflection by the first, second and third reflectors and the transmission through the focusing lens 15.

Figure 1:
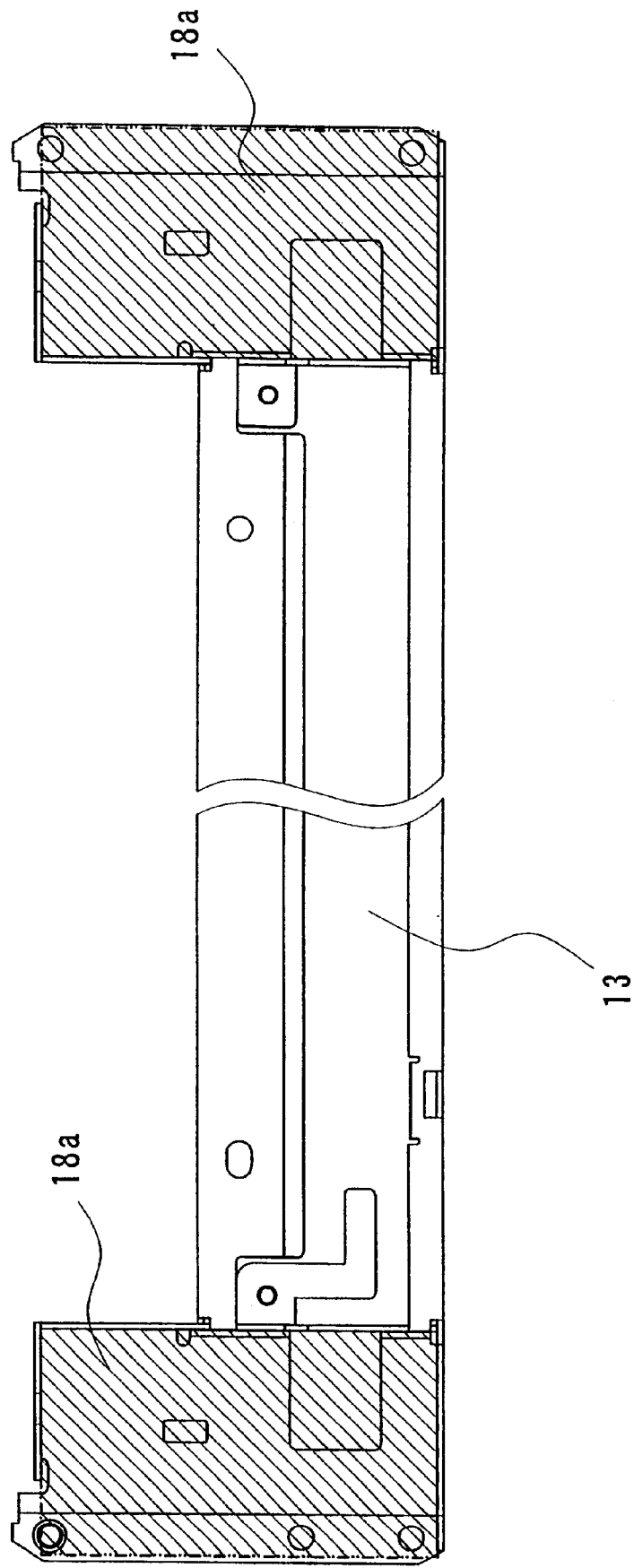
FIG. 1 is a plan view showing a carriage mounting thereon a light source lamp for use in an image processor in a preferred embodiment according to the present invention, wherein parts of an inverter are mounted at hatched portions.

A fluorescent lamp inverter 18 for lighting the fluorescent lamp 17 is mounted at both ends in a direction perpendicular to the moving direction of the full-rate carriage 13 in separation into parts 18a and 18b, as shown by hatches in FIG. 1. In separating the fluorescent lamp inverter 18, it is desirable to separate the fluorescent lamp inverter 18 into the combination of parts, which can secure a stable operation of the fluorescent lamp inverter 18. Both ends of the full-rate carriage 13 are portions to be mounted on guide trucks 12, and further, appropriately extend in the moving direction in order to keep the stability at the time of the movement of the full-rate carriage 13. Consequently, each of the ends of the full-rate carriage 13 has an area sufficient enough to place thereon the part 18a or 18b of the fluorescent lamp inverter 18. Since both ends extend in the moving direction, the full-rate carriage 13 is formed into a substantial U-shape as viewed in plan. Inside of the U-shaped portion is accommodated the half-rate carriage 14.

In reading image information on the original placed on the platen glass by the image processor 10 in the present embodiment, the original is scanned by irradiation with light emitted from the fluorescent lamp 17 while the full-rate carriage 13 is moved. In the state in which the full-rate carriage 13 is positioned at a scanning ending position, no space for accommodating a projecting part need be defined in the casing 11 since there is no part such as a fluorescent lamp inverter projecting beyond the ending position from the full-rate carriage 13, unlike in the prior art. Therefore, the casing 11 can be miniaturized, and further, the image processor 10 also can be miniaturized.

Additionally, since the parts 18a and 18b of the fluorescent lamp inverter 18 are mounted at the ends of the full-rate carriage 13, both ends of the full-rate carriage 13 are brought into a state pressed by guide trucks 12 during the movement by the effect of the weights of these parts 18a and 18b, so that the full-rate carriage 13 can be stably moved. Consequently, it is preferable to equalize the weights in separating the fluorescent lamp inverter 18 into the parts 18a and 18b.

As described above, in the image processor according to the present invention, since the inverter is disposed at the ends of the carriage which mounts the light source lamp thereon and is moved during the scanning, it is possible to dispense with a part projecting from the carriage in the scanning direction. Consequently, in order to position the carriage at the scanning ending position, it is unnecessary to define a space for accommodating such a projecting part in the casing, thereby miniaturizing the casing, and further, miniaturizing the image processor, too.

Furthermore, since the parts of the inverter are disposed in the carriage mounting the light source lamp thereon, a harness or the like for connecting the fluorescent lamp and the inverter to each other cannot be lengthened, thus suppressing occurrence of voltage noise.

In the image processor according to the invention, the inverter is disposed at the portion at which the carriage is supported, it is possible to alleviate a weight load exerted on the carriage.

Moreover, in the image processor according to a preferred embodiment of the invention, the inverter is separated into parts, and the parts are disposed at both ends of the carriage. Thus, the weights can be substantially equally exerted at both ends of the carriage, thereby achieving the stable movement of the carriage during the scanning.

What is claimed is:

1. An image processor for scanning an original at irradiation positions sequentially varied by moving a light source lamp with respect to the original so as to optically gain image information on the original, the image processor comprising:

a carriage for mounting a light source lamp; and an inverter for the light source lamp disposed at an end of said carriage in a direction perpendicular to a scanning direction of a carriage mounting, the light source lamp thereon, wherein component parts of the inverter are disposed at opposite ends of said carriage.

2. An image processor as claimed in claim 1, wherein the component parts of the inverter are disposed at the ends, respectively, for distribution of a substantially equal amount of weight.

3. An image processor for scanning an original at irradiation positions sequentially varied by moving a light source lamp with respect to the original so as to optically gain image information on the original, the image processor comprising:

a carriage movable in a scanning direction, the carriage mounting the light source lamp thereon;

guide means disposed in a casing along the scanning direction, the guide means mounting thereon both ends of the carriage in a direction perpendicular to the scanning direction, for supporting the carriage and guiding the movement of the carriage; and an inverter for the light source lamp disposed at of the end mounted on the guide means for the carriage, wherein component parts of the inverter are disposed at opposite ends of said carriage.

4. An image processor as claimed in claim 3, wherein the component parts of the inverter are disposed at the ends, respectively, for distribution of a substantially equal amount of weight.

* * * * *